(12) United States Patent
Winkelmann et al.

(10) Patent No.: US 8,831,847 B2
(45) Date of Patent: Sep. 9, 2014

(54) REGULATED DRIVETRAIN FOR DAMPING OUT VIBRATIONS

(75) Inventors: Stefan Winkelmann, Bühl (DE); Boris Serebrennikov, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 2727 days.

(21) Appl. No.: 10/487,498

(22) PCT Filed: Aug. 17, 2002

(86) PCT No.: PCT/DE02/03020
§ 371 (c)(1),
(2), (4) Date: Aug. 20, 2004

(87) PCT Pub. No.: WO03/019030
PCT Pub. Date: Mar. 6, 2003

(65) Prior Publication Data
US 2004/0260444 A1 Dec. 23, 2004

(30) Foreign Application Priority Data

Aug. 24, 2001 (DE) .................................. 101 41 612
Nov. 19, 2001 (DE) .................................. 101 56 787

(51) Int. Cl.
*G06F 7/00* (2006.01)
*G06F 17/00* (2006.01)
*G06F 19/00* (2011.01)
*F16D 48/06* (2006.01)
*F16H 57/04* (2010.01)
*F16H 61/662* (2006.01)
*F16H 61/688* (2006.01)
*B60W 30/20* (2006.01)
*F16D 27/00* (2006.01)
*F16D 25/08* (2006.01)

(52) U.S. Cl.
CPC .............. *F16H 57/04* (2013.01); *F16D 48/066* (2013.01); *F16D 48/06* (2013.01); *F16H 61/662* (2013.01); *B60W 2510/0657* (2013.01); *F16H 61/688* (2013.01); *B60W 30/20* (2013.01); *B60W 2710/025* (2013.01); *F16H 61/66272* (2013.01); *B60W 2710/027* (2013.01); *F16D 27/004* (2013.01); *F16D 25/083* (2013.01)
USPC ..................... 701/67; 701/53; 701/60; 701/65

(58) Field of Classification Search
USPC .............................................. 701/65, 53, 60
See application file for complete search history.

(56) References Cited

U.S. PATENT DOCUMENTS

| | | | | |
|---|---|---|---|---|
| 5,190,130 | A | * 3/1993 | Thomas et al. | 477/176 |
| 5,322,150 | A | * 6/1994 | Schmidt-Brucken et al. | 477/176 |
| 6,035,984 | A | * 3/2000 | Kosik et al. | 192/3.61 |
| 6,466,852 | B2 | * 10/2002 | Frohlich et al. | 701/62 |
| 6,560,521 | B1 | 5/2003 | Sakamoto et al. | |

FOREIGN PATENT DOCUMENTS

| | | |
|---|---|---|
| DE | 3411092 | 5/1985 |
| DE | 3411239 | 5/1985 |
| DE | 3418671 | 5/1985 |
| DE | 3628774 | 4/1987 |
| DE | 3630398 | 5/1987 |
| DE | 3721712 | 1/1988 |
| DE | 4239289 | 5/1993 |
| DE | 4239291 | 5/1993 |
| DE | 4306505 | 9/1993 |
| EP | 1072459 | 1/2001 |

* cited by examiner

*Primary Examiner* — Jason Holloway
*Assistant Examiner* — Nicholas Kiswanto
(74) *Attorney, Agent, or Firm* — Simpson & Simpson, PLLC

(57) ABSTRACT

The invention relates to a drivetrain having an automatic clutch.

2 Claims, 2 Drawing Sheets

REGULATED DRIVETRAIN FOR DAMPING OUT VIBRATIONS

CROSS REFERENCE TO RELATED APPLICATIONS

The present application is the U.S. national stage application pursuant to 35 U.S.C. §371 of International Application No. PCT/DE02/03020, filed Aug. 17, 2002, which application claims benefit of German Application No. 101 41 612.1, filed Aug. 24, 2001, and German Application No. 101 56 787.1, filed Nov. 19, 2001.

BACKGROUND OF THE INVENTION

The invention relates to a drivetrain comprising a drive unit having an associated drive shaft, a transmission with at least one transmission input shaft and at least one driving wheel joined to an output shaft of the transmission as well as an automatic actuation friction clutch interposed between the drive unit and the transmission.

Systems of this type have long been included within the state of the art. Typically, the automatic actuation friction clutches are actuated, for example, via actuators that operate according to a hydraulic, pneumatic or electromechanical principle. Furthermore, hydraulic slave cylinders are known that are impinged by a master cylinder driven by an electric motor. In this context, actuators of this type effect an axial movement of appropriately configured actuating means, usually with a throwout bearing being interposed along the rotary axis of the drive shaft or the transmission input shaft and thereby acting in an axial direction on an axial operable energy storage mechanism, such as a cup spring, that axially braces a clutch plate having friction linings and joined in a rotationally fixed manner to the transmission input shaft against frictional engagement surfaces of the clutch plates that are joined in a rotationally fixed manner to the drive shaft of the drive unit. In this way a frictional connection is produced that transmits that torque of the drive unit, such as an internal combustion engine with a crankshaft, to the transmission input shaft. After associated conversion in the transmission, the transmitted torque drives the driving wheels via the transmission output shaft and a differential. The transmission here may be manual-shift or automatically actuated via actuators and having various gear ratios.

Especially in the transmission of torques in the clutch slip phase, i.e., when there is a speed differential between the drive shaft and the transmission input shaft, a so-called judder can occur as a result of component anomalies, axial vibrations of the drivetrain, lining properties and the like. This judder is manifested by virtue of the so-called stick-slip effect being expressed in a temporary clinging of the frictional lining of the clutch plate to the opposing frictional surface of the clutch pressure plate followed by a release of the stiction. As a result, so-called judder vibrations occur in the drivetrain, and for that matter in the entire vehicle, that negatively affect driving comfort and the service life of various components in the motor vehicle.

OBJECTS OF THE INVENTION

The object of the present invention is to damp judder vibrations of this type, to increase driving comfort and/or to improve the stability of the drivetrain. Furthermore, the control of the automatically actuated clutch is to be improved.

SUMMARY OF THE INVENTION

The object is achieved using a drivetrain comprising a drive unit, a transmission having at least one transmission input shaft and at least one transmission output shaft that is in operable connection with at least one driving wheel, an automatically actuated friction clutch being arranged between the at least one transmission input shaft and a drive shaft of the drive unit whose disengagement and engagement operations are controlled via a control device at least as a function of signals of a sensor device that detects a speed of the transmission input shaft and one that detects a speed of the at least one driving wheel, and vibrations that occur in a torque transmission via the fictional surfaces of the friction clutch being damped in that a variable formed from the speed of a transmission output section—for example the speed of the at least one driving wheel, or the speed of the transmission output shaft—and the speed of the transmission input shaft is used as a control parameter for the damping of the vibration.

According to the invention, the drive unit may preferably comprise an internal combustion engine having a crankshaft, but turbines and other units of this type that are suitable for the drive of motor vehicles may also be used. The transmission is preferably configured as a transmission having, for the formation of gear speeds with fixed transmission ratios, multiple gear pairs that are interposed between a transmission input shaft and a transmission output shaft, whereupon in each case a gear having the appropriate ratio can be selected. This type of transmission may be shifted by hand via, for example, a shift lever and corresponding shift linkage, wherein a mechanism, for example a shift lever, can be implemented for selecting a shift gate and appropriate gears shifts can be implemented for shifting. Alternatively, the transmission can be sequentially operated via a gear shift drum or a draw key. The manual actuation means can be replaced by appropriate transmission actuators so that fully automatic transmission results. Moreover, it is understood that the transmission may have several transmission input shafts and/or transmission output shafts so that in an appropriate design, for one thing, a dual clutch mechanism having two transmission input shafts can be implemented, wherein each input shaft may be provided with a clutch that can be equipped with corresponding possibilities for damping the judder action. In particular, the so-called dual-clutch transmissions should be mentioned in this regard in which a clutch engages a gear pair with which the vehicle is operated, while the next gear can already be engaged on the other gear input shaft. It is understood that a system for damping the judder according to the concept of the invention may also be advantageous for automatic transmissions having torque converters and a converter lockup clutch and/or a hydraulic clutch, the definition of judder in this connection also including the slip-stick effect for a wet-running clutch. Branched or unbranched continuously variable transmissions (CVT's), stepped automatic transmissions, toroidal drives, harmonic drive transmissions and power-branched transmissions may be advantageous as transmissions in this sense.

The friction clutch according to the inventive concept is automatically operated in that a drive element that is axially effective along the rotational axis and driven by an actuator acts on the bracing of the clutch plate that is connected in a rotationally fixed manner to the transmission input shaft together with the pressure plate that is connected in a rotationally fixed manner to the drive shaft of the drive unit. The bracing between clutch plate and pressure plates is accomplished in the usual manner by means of an axially effective energy storage device whose action is regulated by the actuator, e.g. with the actuating element being interposed, which includes at least one throwout bearing and the necessary kinematic mechanism between actuator and throwout bearing, for example, a slave cylinder disposed concentrically around the transmission input shaft or parallel to it that is impinged via a hydraulic line with the master cylinder, which is operated by the electric actuator and acts on the throwout bearing. Included in this are all forms of clutch operation, for example known clutches that are compressed, drawn, pressed together or pulled together. The mode of operation of these various types results from the particular arrangement of the axially effective energy storage device, such as cup springs, whereby in its relaxed state a disengaged or engaged clutch position can result as the situation calls for and this position in each case can be brought into the corresponding position—engaged or disengaged—by pressing or pulling on the linkage devices of the energy storage device, such as cup spring projections. The actuator can be, for example, a hydraulic slave cylinder that is impinged with pressure by a suitable pressure supplying device, for example a pump driven by a control device. Alternatively, the slave cylinder can be inpinged by a master cylinder that is operated by an electric motor that is controlled by a control device. Other advantageous alternatives can be hydro-pneumatic or pneumatic master/slave cylinder units. The use of an electric motor that converts the rotary movement of the rotor into an axial movement via a suitable converter mechanism and via this axial movement engages and disengages the clutch may also be especially advantageous. It is understood that compressive or operating forces of the actuator directed in one direction can correspondingly be reversed by suitable counterforce means or compensation means using, for example, axially effective energy storage devices or restoring forces of the cup spring so that an additional operative power on the part of the actuator can be lessened or disregarded. Alternatively, an actuator, especially an electrical actuator, may be solidly joined in both axial directions to linkage mechanism for operating the clutch so that the actuator can be effective in both directions while using an operative power.

According to the inventive concept, the drivetrain contains various sensor devices that are capable of transmitting signals to the control device, the control device evaluating the corresponding signals for controlling the drivetrain. For example, to detect judder of the friction clutch, various signals are processed together. After the control device has detected by processing of the signals that judder is present, a corresponding signal is forwarded in a corrected manner to the actuator in order to damp or compensate the judder. It may be advantageous, for example, to process the speed of the drive shaft and the speed of the transmission input shaft together and to examine them regarding a speed differential of the two shafts. Thus, by appropriate signal evaluation, a distinction can be made between a vibration in the same direction as the direction of rotation, which characterizes judder, a slip, and a vibration superimposed on the direction of rotation that results from the rotational irregularity of the drive unit. If these two types off vibration are separated from each other and the slip taken into account, for example because the typical rotational irregularities are compensated as a function of speed, load requirement of the drive unit and additional parameters of the drive unit, such as temperature, as well as control parameters of an internal combustion engine, such as ignition angle, throttle flap position and the like, the vibration profile of the judder can be analyzed as a function of time and the actuator can be driven according to the compensation of the judder.

The evaluation of sensor signals of the speed of the transmission input shaft in conjunction with the speed of at least one driving wheel may be especially advantageous. The speed of the transmission input shaft may be detected in this context using speed sensors; advantageously, a speed sensor of the anti-lock system is available for the speed of the driving wheel. According to studies, it has surprisingly been shown that judder can be detected using a differential configuration of the two speed signals, by constituting a variable VS that is formed from the speed n(R) of the driving wheel and the speed n(G) of the transmission input shaft. This variable VS may function directly or indirectly as a control parameter for the surface pressure of the frictional surfaces of the clutch plate and the pressure plates of the clutch. Variable VS in this context may be represented especially advantageously as $$VS = n(G) - n(R)*F(i)$$

the Factor F(i) representing the ratio of the gear that has been engaged.

According to the inventive concept, a torque transmitted via the clutch may also be regulated in that, for the particular load requirement of the driver or of the driving situation, a particular torque to be supplied by the drive unit when judder occurs is modulated so that for the torque that is actually transmitted via the clutch a corrected torque (Mkorr) is produced as follows:

$$M(\text{korr}) = M - (n(G) - n(R)*F(i))*K,$$

the correction factor K representing a so-called application parameter, which may be specified in the control device as a function of the vehicle, or in some cases the situation, in the form of, for example, a table value or as a calculation algorithm. For K<0, a damping of the judder occurs.

It is understood that the compensation of the judder occurs as a time-dependent control; that is, the detection of the signals and the conversion of the correction variables, such as corrected torque, must occur more quickly than the frequency of the judder. The typical frequency for the judder, i.e., the time sequence between the adhesion of the frictional lining to the frictional surface of the pressure plates with subsequent releasing of the friction lining, is generally smaller than 20 Hz, in most cases typically 10-12 Hz. The clutch actuator, or typically also called clutch positioner, is thus advantageously controllable with regard to its drive with at least the same frequency or faster. The adjustment of the corrected torque M(korr) in this context occurs by axial shifting of the actuator, which in this frequency range no longer inevitably has to have an ideal assignment of the actually covered travel to the specified setpoint travel. A correction of the actuator may occur in such a way that a corresponding compensation of the setpoint travel is specified as a function of the judder frequency in order to achieve the necessary actually covered actuator travel values. For optimal damping of the judder vibrations, the actuator reacts with respect to its actuator travel in opposition to the amplitude of the judder vibration; that is, in the case of the adhesion of the clutch plate to the pressure plates of the clutch, the surface pressure is taken back by the actuator and accordingly increased when the clutch plate is released. Thus, it must be ensured that between the detected judder signal and the surface pressure to be set or the to-be transmitted corrected torque M(korr) that is to be set a phase shift can occur that must accordingly be taken into account in the control.

For simplification of the entire clutch control method, it may be advantageous to use a detection of the judder only in phases of the clutch control that are especially sensitive, for example, during the slip phases of the clutch. These can be detected during a corresponding evaluation of the sensor signals available in the drivetrain, for example, by determination of the speed differential between drive shaft and transmission input shaft. Moreover, it may be advantageous when the speed of the vehicle is decreasing to switch off the damping as soon as the vehicle has reached a speed close to zero.

BRIEF DESCRIPTION OF THE DRAWINGS

The invention is explained in detail with references to FIGS. 1 and 2, wherein.

DETAILED DESCRIPTION OF THE PREFERRED EMBODIMENT

Figure 1:
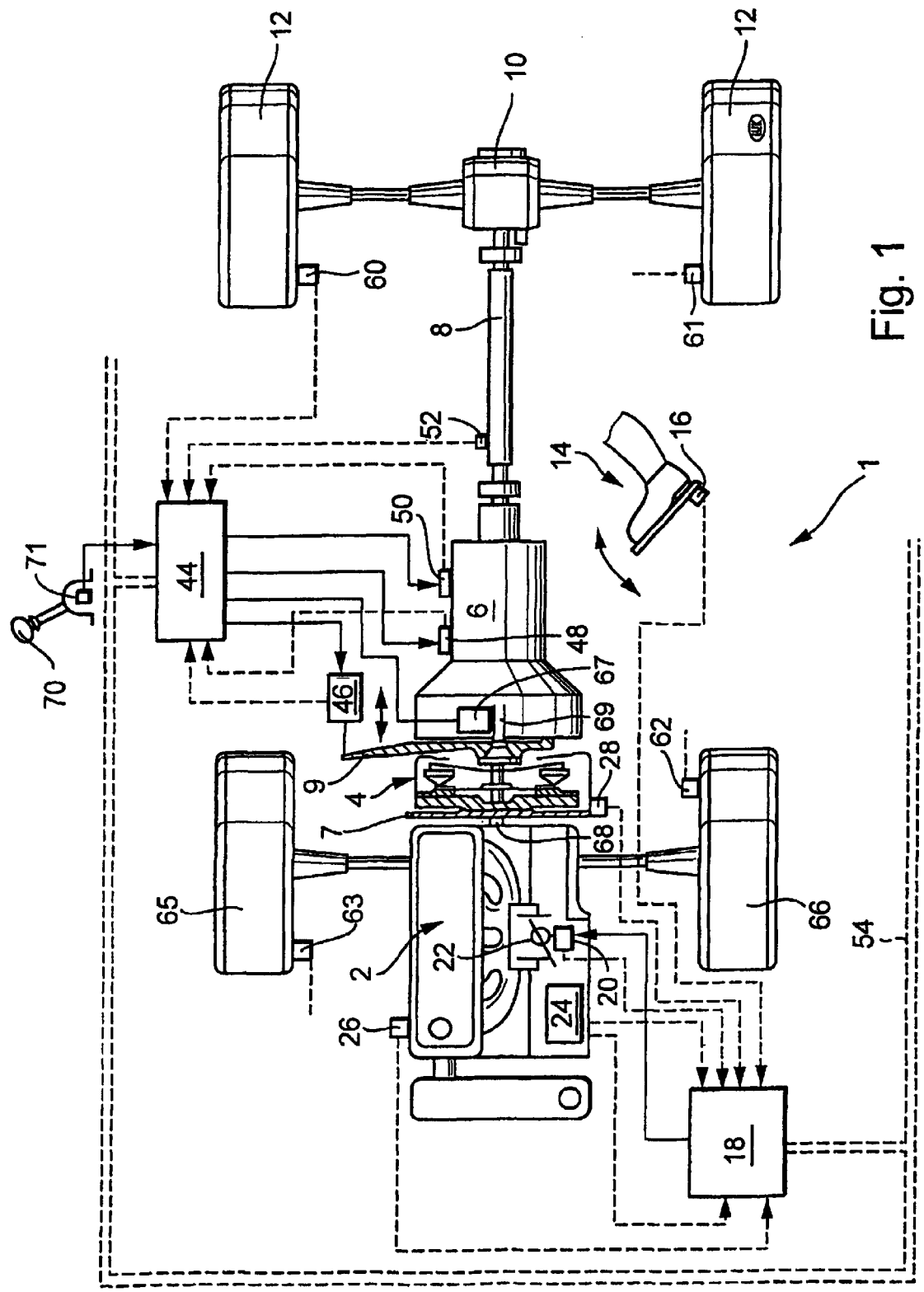
FIG. 1 shows a motor vehicle with a drivetrain according to the invention and
FIG. 2 shows a diagram for determination of the judder.

FIG. 1 shows schematically and by way of example a vehicle 1 in which the invention can be used in an especially advantageous way. Clutch 4 is presently arranged in the flow of force between engine 2 and transmission device 6; expediently, a divided flywheel mass is disposed between engine 2 and clutch 4 whose partial masses can rotate in relation to each other, a spring-damper device being interposed between them, whereupon essentially the vibration technology properties of the drivetrain in particular are improved. Preferably, the invention is combined with a damping device for absorbing or compensating rotational tremors or a device for compensating rotational tremors or a device that reduces rotational tremors or a device for damping vibrations as described in particular in publications DE OS 34 18 671, DE OS 34 11 092, DE OS 34 11 239, DE OS 36 30 398, DE OS 36 28 774 and DE OS 37 21 712 of the applicant, whose disclosures also belonged to the disclosure content of the present application.

Vehicle 1 is driven by an engine 2 with a crankshaft 68 that is presently represented as an internal combustion engine, such as a spark-ignition engine or diesel engine; in another exemplary embodiment, the drive may also be implemented using a hybrid drive, an electric motor or a hydraulic motor. Clutch 4 in the shown exemplary embodiment is a friction clutch by means of which engine 2 is separable from transmission 6, especially for starting off or for performing shift operations. By engaging or disengaging the clutch, more or less torque is transmitted as determined by the clutch states: engaged, slipping or disengaged. For this purpose, a clamping plate and a pressure plate—together referred to as the pressure plates—are axially moved in relation to each other and to a greater or lesser degree entrain a friction plate that is arranged in line and attached in a rotationally fixed manner to transmission input shaft 69, which is only intimated in the drawing. Clutch 4, which is configured as a friction clutch, is advantageously self-adjusting; that is, the wear of the frictional linings is compensated in such a manner that a consistently low disengagement force is ensured. Preferably, the invention is combined with a friction clutch as is described in the applications DE OS 42 39 291, DE OS 42 39 289 and DE OS 43 06 505 of the applicant, whose disclosures also belonged to the disclosure content of the present application.

Using a transmission output shaft 8, wheels 12 of vehicle 1 are driven via a differential 10. Assigned to driven wheels 12 are speed sensors 60, 61, it being possible in some cases to provide only one speed sensor 60 or 61, each of which generates a signal corresponding to the speed of wheels 12; in addition or alternatively, a sensor 52 is provided at another suitable position in the drivetrain, for example at shaft 8, for determination of the transmission output speed. The transmission input speed can be determined using an additional sensor 67, which in this case is disposed directly at transmission input shaft 69 but in other exemplary embodiments may also be mounted at a different position, or even determined from the engine speed with the clutch fully engaged while taking into consideration and compensating corresponding disturbance variables, such as torsional vibrations, rotational irregularities and the like. The speed ratio of a selected gear may be determined, for example, by comparing the speeds before and after the transmission using, for example, sensors for determining the engine speed or transmission input shaft speed and, respectively, the transmission output shaft speed or a wheel speed or via information especially from sensors for controlling actuation mechanism for the automatic clutch and/or in some cases for the automatic transmission.

An operation of friction clutch 4, which can advantageously be pressed, or in another exemplary embodiment also pulled, is accomplished in the present example using an actuation device 46, such as a clutch actuator. To operate transmission 6, an actuation device that includes two actuators 48 and 50 is provided, one of the actuators carrying out a selection operation and the other a shifting operation. Clutch actuator 46 is designed as an electrohydraulic system, an engagement or disengagement movement being produced using an electrical drive, for example an electric DC motor, and being transmitted via a hydraulic line to the disengagement system. Transmission actuators 48 and 50 are designed as electrical drives, for example as electrical DC motors, which are joined via kinematics to the movable members in transmission 6 that are operated for designation of the gear ratio.

In another exemplary embodiment, especially if large actuation forces are required. It may also be expedient to provide a hydraulic system for the actuation.

The control of clutch 4 and transmission 6 is accomplished using a control device 44 that expediently forms a structural unit together with clutch actuator 46, whereby it may also be advantageous in another exemplary embodiment to mount it at another place in the vehicle. The operation of clutch 4 and transmission 6 may be performed automatically using an automatic operating mode of control unit 44 or in a manual operating mode using a driver input via a driver input device 70, such as a shift lever, the input being detected by a sensor 71. In automatic operating mode, gear ratio changes are carried out using a suitable drive of actuators 46, 48 and 50 according to characteristic curves that are stored in a memory assigned to control device 44. A number of driving programs that are pre-determined by at least one characteristic curve are available, among which the driver can select, for example: a motorsport driving program in which engine 2 is operated in a manner that optimizes power, an economy program in which engine 2 is operated in a manner that optimizes fuel consumption or a winter program in which engine 2 is operated in a manner that optimizes driving safety; moreover, in the described exemplary embodiment, characteristic curves are adaptable, for example, to driver behavior and/or to other framework conditions such as road wear, outside temperature, etc.

A control device 18 controls engine 2 via influence on gas mixture supply or composition, a throttle flap whose signal is available to control device 18 being depicted in the figure as an example. In other designs of the engine control, an appropriate signal is made available to control device 18, if is an internal combustion engine, and may be used to determine the mixture composition and/or the volume supplied; expediently, the signal of an existing lambda probe is also used. Moreover, in the present embodiment a signal of a shift lever 14 whose position is detected by a sensor 16, a signal related to an engine speed generated by a speed sensor 28, which is assigned to the driven engine shaft, a signal of a vacuum tube pressure sensor 26 and a signal of a cold water temperature sensor 24 are available to control device 18.

Control devices 18 and 44 can be configured in structurally or functionally separate partial areas, then they are expediently connected to each other via, for example, a CAN bus 54 or another electrical connection for data exchange. However, it may be advantageous to combine the areas of the control devices, especially since an assignment of the functions is not always clearly possible and a combination is necessary. In particular, during specific phases of the gear changing, control device 44 can control engine 2 with regard to speed and/or torque.

Both clutch actuator 46 and transmission actuators 48 and 50 produce signals from which at least one actuator position can be derived that is available to control device 44. The position determination is accomplished in the present example within the actuator, an incremental sensor being used that determines the actuator position in relation to a reference point. However, in another exemplary embodiment, it may also be expedient to dispose the sensor outside the actuator and/or provide an absolute position determination using, for example, a potentiometer. A determination of the actuator position is especially therefore of great significance with regard to the clutch actuator since in this way the gripping point of clutch 4 can be assigned to a specific engagement travel and thus an actuator position. Advantageously, the gripping point of clutch 4 when starting off and during operation is repeatedly reset, especially as a function of parameters such as clutch wear, clutch temperature, etc. A determination of the transmission actuator position is important with regard to the determination of the gear ratio that is selected.

Moreover, signals of speed sensors 62 and 63 of non-driven wheels 65 and 66 are available to control device 44. To determine a vehicle speed, it may make sense to use the average value of speed sensors 62 and 63 or 60 and 61 in order to even out differences in speed, such as in cornering. Using the speed signals, the vehicle speed may be determined, and moreover, a slip detection may also be carried out. In the figure, output connections of the control devices are represented as continuous lines, and input connections are represented as dashed lines. The connection of sensors 61, 62 and 63 to the control device is only intimated.

The judder that occurs on friction clutch 4 can be derived by evaluation of the speed of engine speed sensor 28 and speed sensor 67 of transmission input shaft 69. Thus, vibrations due to rotational irregularities and the slip in clutch 4 are to be compensated in the not completely engaged state. In addition, signals and information of the engine control such as stored program maps and sensor data, information from the clutch control such as actuator travel, actuator vibrations, actuator loads such as actuator currents when using an electric actuator, and information of the transmission control such as sensor signals, gear information, transmission input and output shaft speeds, wheel speeds and the like cannot be called on exclusively for this compensation.

The evaluation of the speeds of transmission shaft 69 and the speed past the transmission in the direction of driving wheel 12 has proven especially advantageous for the detection and damping of judder of clutch 4. Thus, the last speed from wheel speed sensors 60, 61 may be determined, a combination of the two sensors for averaging of the sensors possibly also being advantageous. If a separate sensor 52 is available on output shaft 8, it may also be evaluated instead of the wheel speed sensor. In tests, it has been shown that, especially by formation of the difference of the speeds in front of and behind transmission 6, a judder can be detected and even quantitatively evaluated with regard to frequency and amplitude. The signals of the sensors 67 and 52 or 60, 61 are transmitted to and evaluated in control device 44 at the appropriate detection rate, which advantageously is faster than the frequency of the judder. When slip is present, a new setpoint torque, which is useful for damping the judder and which the clutch is to transmit to transmission 6, is calculated and converted into an actuator travel of actuator 46. Actuator 46 is therefore operated in a modulated manner as a function of the frequency and the amplitude of the judder. It has been shown that when using an electric actuator, the quality of the damping is a function of the mass inertia of the rotor and the quality of the acceleration of the rotor of the electric machine; so, it is very advantageous to use an electric actuator as an electric machine that is electronically commutated in such a manner that, in addition to an advantageously small structural space, a small mass inertia of the rotor can be provided, because the coil form in the rotor can be omitted.

Figure 2:
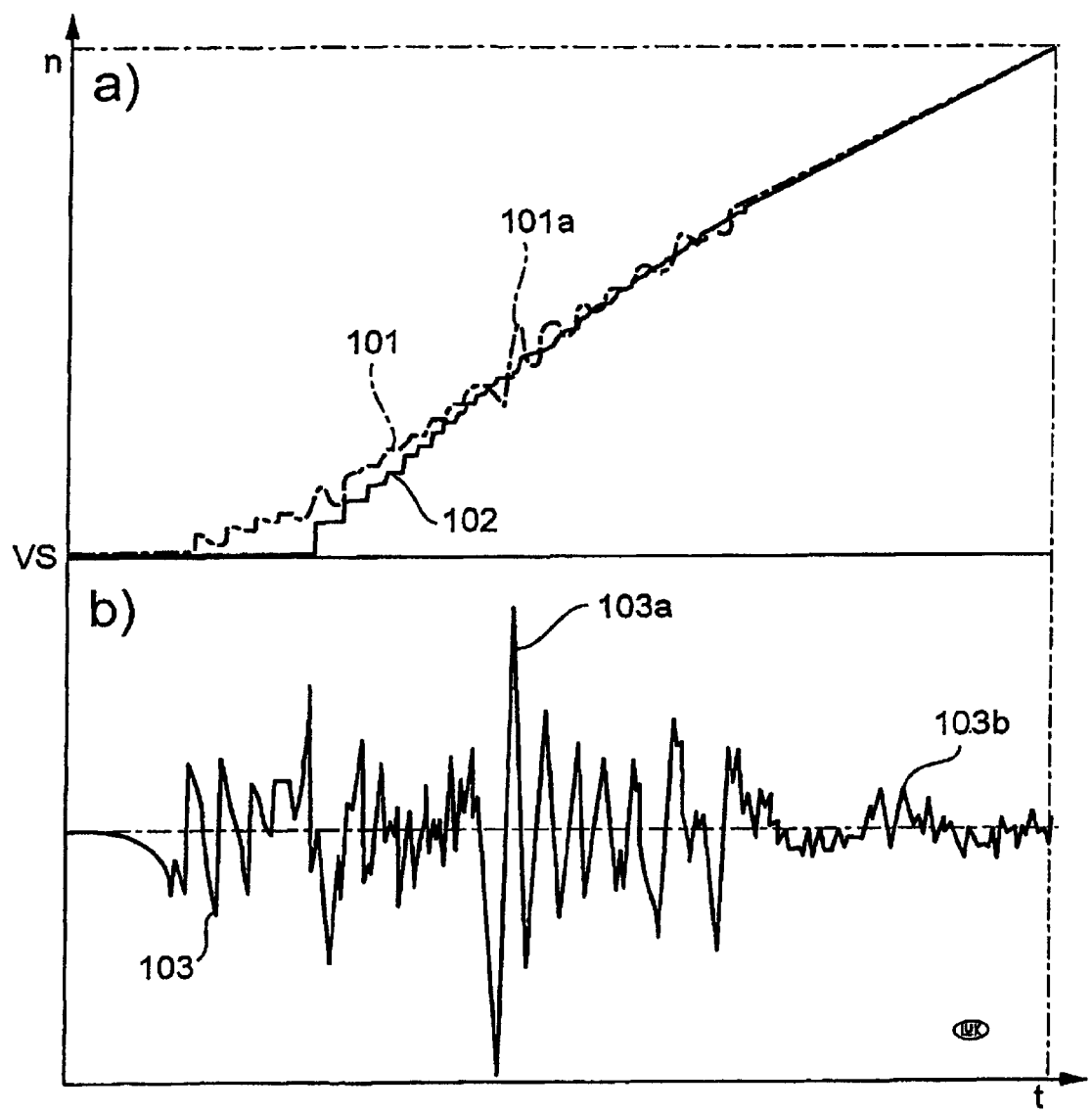

FIG. 2 shows a two-part diagram in which a time characteristic 101 of the speed of transmission input shaft 69 and time characteristic 102 of one of wheel speed sensors 60, 61 are represented in segment a, characteristic 102 being multiplied using the currently selected gear ratio. The differing characteristics result in time sequence 103 of difference VS of the two curves 101, 102, as shown in segment b. If judder occurs, in range 101a a clear change of the course of curve 101 is visible to which the course of curve 102 does not correspond due to the damping effect of the transmission components so that a correspondingly high increase 103a is apparent when slip occurs due to the formation of the difference in the corresponding time range. The time characteristic of curve 103 flows into the calculation of a setpoint torque that is to be corrected as a function of the judder and transmitted by clutch 4 so that clutch actuator 46 is appropriately modulated for transmission of the torque. It is understood that filter functions of a computational and/or electronic type may be superimposed on the calculation algorithm, and the damping of the judder is activated as a function of a limit value being exceeded that is set in relation to the, preferably averaged, base signal 103b, whereby a multiple of the base signal can be set as limit value and the base value can be currently determined as a function of the current operational situation of the motor vehicle or permanently stored in a memory.

The patent claims submitted along with the application are formulation proposals without prejudice for the attainment of ongoing patent protection. The applicant reserves the right to claim additional feature combinations that so far are only disclosed in the description and/or drawings.

References used in the dependent claims point to the further formation of the subject matter of the main claim by the features of each dependent claim; they are not to be understood as renunciation of the attainment of a separate, concrete protection for the feature combinations of the referred dependent claims.

Because the subject matter of the dependent claims may form separate and independent inventions with respect to the state of the art on the priority date, the applicant reserves the right to make them the subject matter of independent claims or separation statements. They may furthermore also include independent inventions that have a configuration independent of the subject matters of prior dependent claims.

The exemplary embodiments are not to be understood as a limitation of the invention. Rather, numerous amendments and modifications are possible within the context of the present publication, especially such variants, elements and combinations and/or materials as may be inferred by one skilled in the art with regard to the resolution of the problem using, for example, a combination or modification of individual features or elements or methodological steps that are described in connection with the general description and embodiments as well as the claims and that are contained in the drawings and, using combinable features, lead to a new subject matter or to new methodological steps or methodological sequences, even if they pertain to manufacturing, testing and operating method.

What is claimed is:

1. A drivetrain comprising a drive unit, a transmission having at least one transmission input shaft and at least one transmission output shaft in operative connection with at least one driving wheel, there being provided between the at least one transmission input shaft and a drive shaft of the drive unit an automatically actuated friction clutch whose engagement and disengagement operations are controlled via a control device at least as a function of signals of a sensor device that detects a speed of the transmission input shaft and a speed of the at least one drive wheel, vibrations occurring in a torque transmission via frictional surfaces of the friction clutch being damped, wherein a variable VS, formed from the speed n(R) of a transmission output section and the speed n(G) of the transmission input shaft, functions as a control parameter for controlling the engagement and disengagement operations to dampen the vibrations occurring in the friction clutch, wherein a damping of the vibrations is performed if an average amplitude of the vibrations has a predetermined limit value.

2. A drivetrain comprising a drive unit, an automatic transmission having at least one transmission input shaft and at least one transmission output shaft in operative connection with at least one driving wheel, there being provided between the at least one transmission input shaft and a drive shaft of the drive unit an automatically actuated friction clutch whose engagement and disengagement operations are controlled via a control device at least as a function of signals of a sensor device that detects a speed of the transmission input shaft and a speed of the at least one drive wheel, vibrations occurring in a torque transmission via frictional surfaces of the friction clutch being damped, wherein a variable VS, formed from the speed n(R) of a transmission output section and the speed n(G) of the transmission input shaft, functions as a control parameter for controlling the engagement and disengagement operations to dampen the vibrations occurring in the friction clutch.

* * * * *